M. GOHLKE.
BALL BEARING.
APPLICATION FILED FEB. 3, 1915.
1,239,904.
Patented Sept. 11, 1917.
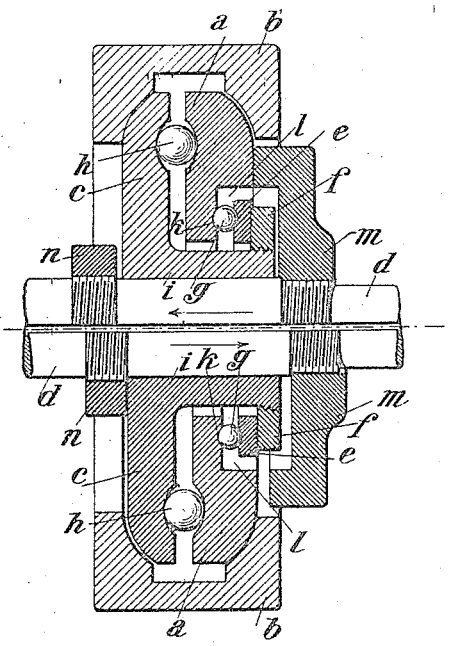

UNITED STATES PATENT OFFICE.

MAX GOHLKE, OF PANKOW, NEAR BERLIN, GERMANY, ASSIGNOR TO THE HESS-BRIGHT MANUFACTURING COMPANY, A CORPORATION OF DELAWARE.

BALL-BEARING.

1,239,904.  Specification of Letters Patent.  Patented Sept. 11, 1917.

Application filed February 3, 1915. Serial No. 5,839.

*To all whom it may concern:*

Be it known that I, MAX GOHLKE, engineer, subject of the King of Prussia, residing at Pankow, near Berlin, No. 5/6 Florastrasse, Germany, have invented certain new and useful Improvements in Ball-Bearings, of which the following is a specification.

In double-acting thrust ball bearings for shafts with a single row of thrust balls the ball race rings must be arranged with axial play in the housing to enable the free rotation of that one of the two ball race rings which is temporarily rotating with the shaft. This axial play is made as small as possible in order to obviate displacement of the balls in their races.

If such ball bearings are used for high speed shafts with low thrust, the ball race rings are spread by the centrifugal force of the balls, thereby annulling the axial play.

Now according to the present invention this defect is obviated by the arrangement of an auxiliary thrust ball bearing between the ball race rings which effectively prevents the spreading of the ball race rings, so that the necessary axial play is always maintained.

The drawing illustrates by way of example an embodiment of the invention in axial section. The upper part of the drawing shows the parts of the bearings when the thrust of the shaft is acting from the right hand side while the lower part shows the same parts when the thrust is acting from the other side. The rotating parts of the bearing for the time being are marked by darker hatching.

Referring to the drawing, the ball race ring $c$ which supports itself with a spherical outer surface against a correspondingly shaped surface of the housing $b$ is mounted on the shaft $d$ by means of a sleeve part $i$, upon the threaded end of which is screwed a nut $f$. The other ball race ring, $a$, which also fits with a spherical surface into the housing $b$ is provided with a central opening through which the sleeve $i$ passes. On the outer surface of this ring $a$, for instance on the base of a recess $l$ provided in this ring, a raceway $k$ for the auxiliary thrust balls $g$ is formed, the other race ring $e$ of these balls being held by means of the nut $f$ against the balls.

On the exterior of the main thrust bearing, nuts $n$, $m$ are screwed upon the shaft $d$ serving as abutments for the ball race rings $a$, $c$ and transmitting the thrust of the shaft to the housing.

Between the spherical surfaces of the rings $a$, $c$ and of the housing $b$ small axial play is provided.

In such a bearing the ball race rings $a$, $c$ cannot be spread by the centrifugal force of the balls $h$ of the main thrust bearing so far that the axial play between the housing and that one of the main ball race rings which is temporarily rotating with the shaft, is annulled, because the spreading pressure of these balls is counteracted by the auxiliary thrust ball bearing.

The action of the auxiliary thrust ball bearing is specially to be remarked if the shaft is rotating at high speed and the direction of thrust is slowly changed. In this case the bearing will be for some time without any thrust so that the centrifugal force of the balls $h$ would press both the ball race rings $a$, $c$ against the housing $b$ and thereby cause rubbing of these rings, if the auxiliary thrust ball bearing did not counteract this centrifugal force.

The embodiment of the invention shown in the drawing is further advantageous by the arrangement of the auxiliary thrust ball bearing in a recess of one of the ball race rings of the main bearing, thereby obviating a considerable enlargement of the whole construction by the provision of an auxiliary thrust ball bearing.

I claim:

1. In a double-acting thrust ball bearing for shafts and a suitable housing therefor, ball race members with balls between them adapted to transmit thrust from the shaft to the housing and arranged with axial play in said housing, and positively acting means adapted to prevent said ball race members being spread by the centrifugal force of said balls.

2. In a double-acting thrust ball bearing for shafts and a suitable housing therefor, ball race members with balls between them adapted to transmit thrust from the shaft to the housing and arranged with axial play in said housing, and means comprising antifriction members coöperating with each other and holding said ball race members together against the spreading action of the centrifugal force of the said balls.

3. In a double-acting thrust ball bearing for shafts and a suitable housing therefor, ball race members with balls between them adapted to transmit thrust from the shaft to the housing and arranged with axial play in said housing, and an auxiliary thrust ball bearing arranged between said ball race members and adapted to counteract the spreading action of the centrifugal force of the balls of the main thrust bearing.

4. In a double-acting thrust ball bearing for shafts and a suitable housing therefor a pair of ball race rings with balls between them adapted to transmit thrust from the shaft to the housing and arranged with axial play in the housing, a sleeve on one of said rings mounted on the shaft and passing through a central opening of the other one of said rings, a shoulder on said sleeve, an auxiliary ball race ring abutting against said shoulder and auxiliary thrust balls between said auxiliary ring and the second ring of the main thrust ball bearing.

5. In a double acting thrust ball bearing having a single row of thrust balls, the combination of a housing provided with opposing abutments, ball race members, a row of thrust balls between said members, said members being arranged between said abutments with limited axial play and adapted to transmit the thrusts from the shaft respectively to said abutments, and means coöperating with one of said ball race members and preventing said members from being spread apart by the centrifugal force of the balls.

In testimony whereof I have affixed my signature in presence of two witnesses.

MAX GOHLKE.

Witnesses:
HENRY HASPER,
WOLDEMAR HAUPT.